Sept. 22, 1925.　　　　　　　　　　　　　　　　　　1,554,678
O. C. JONES
DUMP FEEDER
Filed May 1, 1923　　　　2 Sheets-Sheet 1
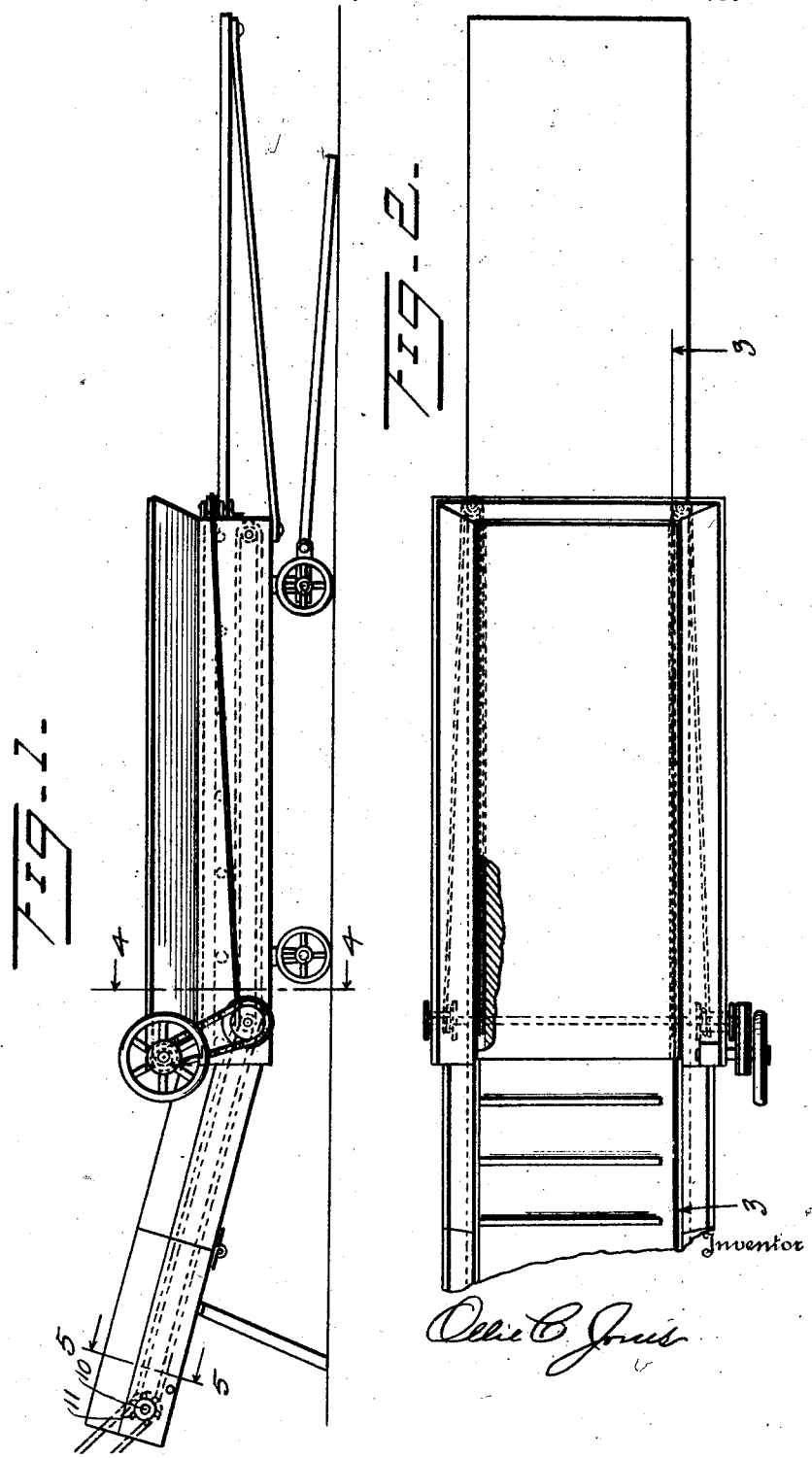

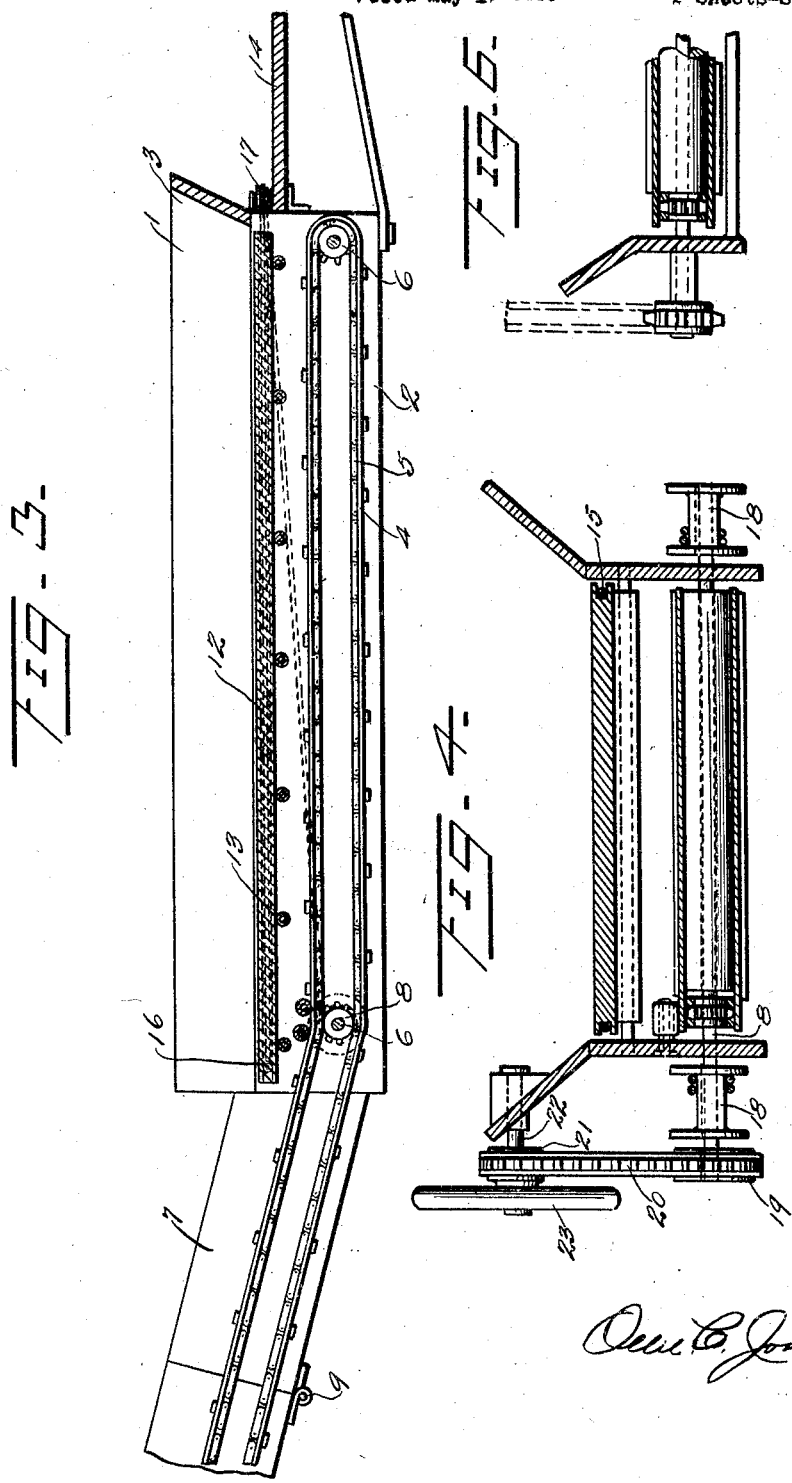

Patented Sept. 22, 1925.

1,554,678

UNITED STATES PATENT OFFICE.

OLLIE C. JONES, OF RUSHVILLE, MISSOURI.

DUMP FEEDER.

Application filed May 1, 1923. Serial No. 635,928.

*To all whom it may concern:*

Be it known that I, OLLIE C. JONES, a citizen of the United States, residing at Rushville, in the county of Buchanan and State of Missouri, have invented certain new and useful Improvements in a Dump Feeder, of which the following is a specification.

This invention relates to dump feeders and more particularly to the class of devices used with grain separating or threshing machines, for the purpose of more expeditiously handling the bundles as they are discharged from the separator or threshing machine.

The primary object of the invention is to provide a device which may be associated with the separator or threshing machine and controlled by an operator whereby the bundles of grain may be received from the rack, conveying them into the separator or threshing machine, and so arranged that it will be entirely within the control of the operator.

Other objects of the invention will appear upon consideration of the following detailed description and accompanying drawings:

Figure 1 is a side elevation of the device constructed in accordance with my invention.

Figure 2 is a plan view of the same.

Figure 3 is a longitudinal section taken on the line 3—3 of Figure 2.

Figure 4 is a transverse section taken on the line 4—4 of Figure 1.

Figure 5 is a detailed section taken on the line 5—5 of Figure 1.

Referring to the drawing by numerals, the body 1 consists of a relatively large box 2 having flared top sections 3 forming a hopper to receive the bundles of grain from the rack. The body is preferably mounted upon wheels so that it may be easily transported. Arranged within the lower portion of the body is a conveyor which consists of an endless belt 4 attached to chains 5 which pass over sockets 6 located in opposite ends of the box and which are trained upwardly to an angularly disposed elevator 7 hingedly mounted on the shaft 8 which carries the socket at the adjacent ends of the box. The elevator 7 is hinged between its ends as indicated at 9 so that it may be adapted for use with various makes of threshing machines and separators. As shown in Figure 1, the upper end of the elevator 7 is provided with a shaft 10 having sprocket 11 thereon, over which the chains are trained whereby a continuous conveyor is formed leading from the front of the box to a point at the upper end of the elevator 7. The shaft 10 is driven by any suitable means and is preferably connected to the source of power which runs the threshing machine or separator.

Arranged in the body or box 2 is a false bottom 12 which is longitudinally movable and is mounted upon rollers 13 and is adapted to be longitudinally extended out through the front of the box and over the supporting frame 14 provided for that purpose. The marginal edges of the movable bottom 12 are provided with grooves to receive operating cables 15, which are secured to the rear end of the movable bottom as indicated at 16. These cables are trained over pulleys 17 located at the forward end of the box and extend rearwardly to the trained-over drums 18 mounted on extensions of the shaft at opposite sides of the box 2. The shaft 8, at one end thereof, also carries a socket 19 to receive a chain 20 which passes over a socket 21 on the countershaft 22. This shaft 22 is provided with a handwheel 23 whereby the operator may manually impart power to the drums 18 for winding the cables 15 thereon.

When the device is in operation, the bundles of grain will be received from the rack and be deposited upon the movable bottom 12. To deposit some of the bundles upon the movable conveyor, the operator will turn the handwheel 23 and thus cause the movable bottom to extend outwardly over the supporting frame 14 and permit some of the bundles to drop upon the endless conveyor, which by virtue of its continuous movement will carry some of the bundles upwardly through the elevator 7 and pass up to the separator or threshing machine. In this manner the operator may entirely control the supply of bundles deposited on the conveyor.

Minor changes can be made in the details of construction without departing from the spirit of the invention or the scope of the claim herein appended.

What I claim is:

A feeder comprising a body, an endless belt mounted for movement along the body and having an end portion extending beyond the end of the body, a shaft disposed transversely of the body, belt guiding means carried by the shaft, rollers journaled in the body above the belt and disposed transversely of the body, a bottom panel slidably mounted upon the rollers for movement longitudinally of the belt and provided at its edges with grooves, pulleys journaled upon the body, cables trained around the pulleys and connected at their ends with the inner portion of the panels and disposed along the grooves thereof, drums mounted upon the shaft and located beyond the sides of the body, the said cables being arranged to wind upon the drum and means for manually rotating the shaft.

In testimony whereof, I have affixed my signature.

OLLIE C. JONES.